(12) United States Patent
Liu et al.

(10) Patent No.: US 7,650,701 B2
(45) Date of Patent: Jan. 26, 2010

(54) CONTOUR MEASURING PROBE

(75) Inventors: Qing Liu, Shenzhen (CN); Jun-Qi Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 58 days.

(21) Appl. No.: 11/966,952

(22) Filed: Dec. 28, 2007

(65) Prior Publication Data
US 2009/0007450 A1  Jan. 8, 2009

(30) Foreign Application Priority Data
Jul. 6, 2007  (CN)  ......................... 2007 1 0201026

(51) Int. Cl.
*G01B 5/004* (2006.01)
*G01B 5/20* (2006.01)

(52) U.S. Cl. .......................... 33/556; 33/559; 33/DIG. 2

(58) Field of Classification Search .................. 33/556, 33/558, 559, 561, 557, 560, DIG. 2
See application file for complete search history.

(56) References Cited

U.S. PATENT DOCUMENTS

| | | | | |
|---|---|---|---|---|
| 4,509,263 A * | 4/1985 | Andrie et al. | ................ | 33/558 |
| 5,174,039 A * | 12/1992 | Murai | .......................... | 33/556 |
| 5,473,822 A * | 12/1995 | Struble | ......................... | 33/559 |
| 6,539,642 B1 * | 4/2003 | Moriyasu et al. | ............... | 33/551 |
| 7,065,893 B2 * | 6/2006 | Kassai et al. | ................... | 33/554 |
| 7,121,013 B2 * | 10/2006 | Herkt et al. | .................... | 33/551 |
| 7,398,603 B2 * | 7/2008 | Liu et al. | ....................... | 33/559 |
| 2009/0007449 A1 * | 1/2009 | Liu et al. | ....................... | 33/556 |
| 2009/0025241 A1 * | 1/2009 | Liu et al. | ....................... | 33/557 |
| 2009/0030650 A1 * | 1/2009 | Liu et al. | ..................... | 702/168 |
| 2009/0037140 A1 * | 2/2009 | Liu et al. | ..................... | 702/168 |
| 2009/0037141 A1 * | 2/2009 | Liu et al. | ..................... | 702/168 |
| 2009/0094849 A1 * | 4/2009 | Kong et al. | ..................... | 33/556 |

* cited by examiner

*Primary Examiner*—Amy Cohen Johnson
(74) *Attorney, Agent, or Firm*—Frank R. Niranjan

(57) ABSTRACT

An exemplary contour measuring probe (10) includes a tube guide (12), a tip extension (20), a pair of hollow tubes (16), a plurality of pipes (104, 106), a linear measuring scale (18), and a displacement sensor (19). The tip extension (20) is configured to touch a surface of an object (50). The hollow tubes (16) are configured to be driven by a flux of air to push the tip extension (20) to move. The pipes (104, 106) are obliquely disposed in a tube guide (12) relative to the hollow tubes (16). The pipes (104, 106) allow the flux of air to be pumped on a sidewall of the hollow tubes (16). A part of the flux of air is ejected out of the tube guide (12). The linear measuring scale (18) and the displacement sensor (19) are respectively fixed relative to one of the tube guide (12) and the tip extension (20). The linear measuring scale (18) displays values of displacements of the tip extension (20). The displacement sensor (19) detects and reads the displacement values displayed by the linear measuring scale (18).

18 Claims, 6 Drawing Sheets

CONTOUR MEASURING PROBE

CROSS-REFERENCE TO RELATED APPLICATIONS

This application is related to nine co-pending U.S. patent applications, which are: application Ser. No. 11/611,724, filed on Dec. 15, 2006, and entitled "DISTANCE MEASURING PROBE WITH AIR DISCHARGE SYSTEM", application Ser. No. 11/843,664, filed on Aug. 23, 2007, and entitled "CONTOUR MEASURING DEVICE WITH ERROR CORRECTING UNIT", application Ser. No. 11/966,951, and entitled "CONTOUR MEASURING PROBE", applications Ser. Nos. 11/966,957 and 11/966,956, and entitled "CONTOUR MEASURING METHOD FOR MEASURING ASPECTS OF OBJECTS", application Ser. No. 11/966,964, and entitled "MEASURING DEVICE FOR MEASURING ASPECTS OF OBJECTS", application Ser. No. 11/966,961, and entitled "MEASURING DEVICE AND METHOD FOR USING THE SAME" application Ser. No. 11/966,959, and entitled "BASE AND CONTOUR MEASURING SYSTEM USING THE SAME", and applications Ser. No. 11/966,954, and entitled "CONTOUR MEASURING PROBE FOR MEASURING ASPECTS OF OBJECTS". In Ser. No. 11/611,724, Ser. No. 11/843,664, Ser. No. 11/966,951, Ser. No. 11/966,957, and Ser. No. 11/966,956, the inventors are Qing Liu, Jun-Qi Li, and Takeo Nakagawa. In Ser. No. 11/966,961, Ser. No. 11/966,964, and Ser. No. 11/966,959, the inventors are Qing Liu and Jun-Qi Li. In Ser. No. 11/966,954, the inventors are Jian-bin Kong and Qing Liu. In Ser. No. 11/611,724 and Ser. No. 11/843,664, the assignee is Hon HAI PRECISION INDUSTRY CO. LTD and FINE TECH Corporation, and the assignee of other applications is HONG FU JIN PRECISION INDUSTRY (ShenZhen) CO., LTD and Hon HAI PRECISION INDUSTRY CO. LTD.

BACKGROUND OF THE INVENTION

1. Field of the Invention

The present invention relates generally to contour measuring probes for coordinate measuring machines (CMMs); and more particularly to a contour measuring probe using a relatively small measuring force for contact-type contour measuring devices.

2. Discussion of the Related Art

Manufactured precision objects such as optical components (for example, aspherical lenses) and various industrial components need to be measured to determine whether manufacturing errors of the objects are within acceptable tolerance ranges. Such manufacturing errors are differences between design dimensions of the object and actual dimensions of the manufactured object. Measured dimensions of the manufactured object are usually regarded as the actual dimensions. A precision measuring device is used to measure the objects; and the more precise the measuring device, the better. Generally, the precision objects are measured with a coordinate measuring machine (CMM), which has a touch trigger probe that contacts the objects. A measuring force applied to the touch trigger probe of the coordinate measuring machine should be small and steady. If the measuring force is too great, a measuring contact tip of the touch trigger probe is easily damaged and causes a measuring error. If the measuring force is not steady, a relatively large measuring error occurs.

As indicated above, a contact-type coordinate measuring device is commonly used to measure dimensions of precision objects such as optical components and certain industrial components. A measuring force is provided to the touch trigger probe by the coordinate measuring device. However, if the object has a slanted surface, the contact tip of the touch trigger probe may become bent or deformed by a counterforce acting on the touch trigger probe, thereby causing a measuring error. Therefore, the touch trigger probe is not ideal for measuring precision lenses having slanted surfaces.

Nowadays, two methods are generally used to reduce a measuring force on the touch trigger probe. In a first method, the contact tip is slantingly arranged so that a component force of gravity acting on the measuring contact tip is regarded as a measuring force. The contact tip is very light, so the measuring force is very small accordingly. However, if a slanted angle of the contact tip changes during measuring, the measuring force changes, which makes the measuring force difficult to control. In a second method, the touch trigger probe is configured with a spring. An elastic force of the spring is regarded as a measuring force. However, when the contact tip moves upward and downward along the surface of the object being measured, a vibration of the upward and downward movement may cause the spring to resonate and deform. Therefore, the measuring force varies with the deformation of the spring. Thus both methods are subject to errors occurring in the measurement results.

In another kind of probe, a measuring force is provided by an air pump. However, the air pump provides pulsed pressure. Therefore, the air pump cannot provide a small, steady measuring force.

Therefore, a contour measuring probe employing a relatively small, steady measuring force is desired.

SUMMARY

An exemplary contour measuring probe includes a tube guide, a tip extension, a pair of hollow tubes, a plurality of pipes, a linear measuring scale, and a displacement sensor. The tip extension is configured to touch a surface of an object. The hollow tubes are configured to be driven by a flux of air to push the tip extension to move. The pipes are obliquely disposed in a tube guide relative to the tubes. The pipes allow the flux of air to be pumped on a sidewall of the hollow tubes. A part of the flux of air is ejected out of the tube guide. The linear measuring scale and the displacement sensor are respectively fixed relative to one of the tube guide and the tip extension. The linear measuring scale displays values of displacements of the tip extension. The displacement sensor detects and reads the displacement values displayed by the linear measuring scale.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the contour measuring probe. Moreover, in the drawings, like reference numerals designate corresponding parts throughout the several views.

DETAILED DESCRIPTION OF THE EMBODIMENTS

Figure 1:
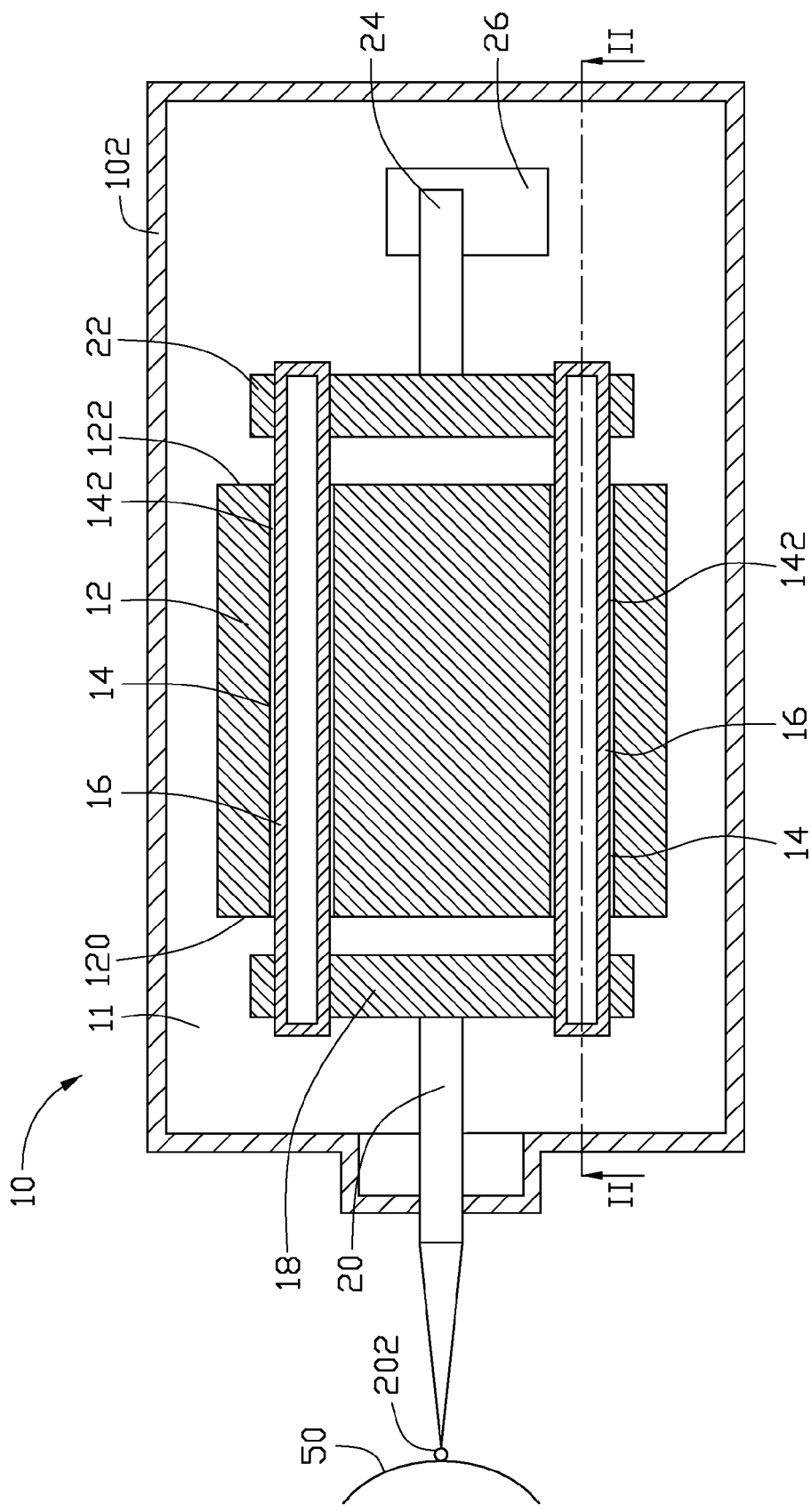
FIG. 1 is a top plan, cross-sectional view of a contour measuring probe in accordance with a first embodiment of the present invention, the contour measuring probe including a tube guide and a pair of tubes.
Figure 2:
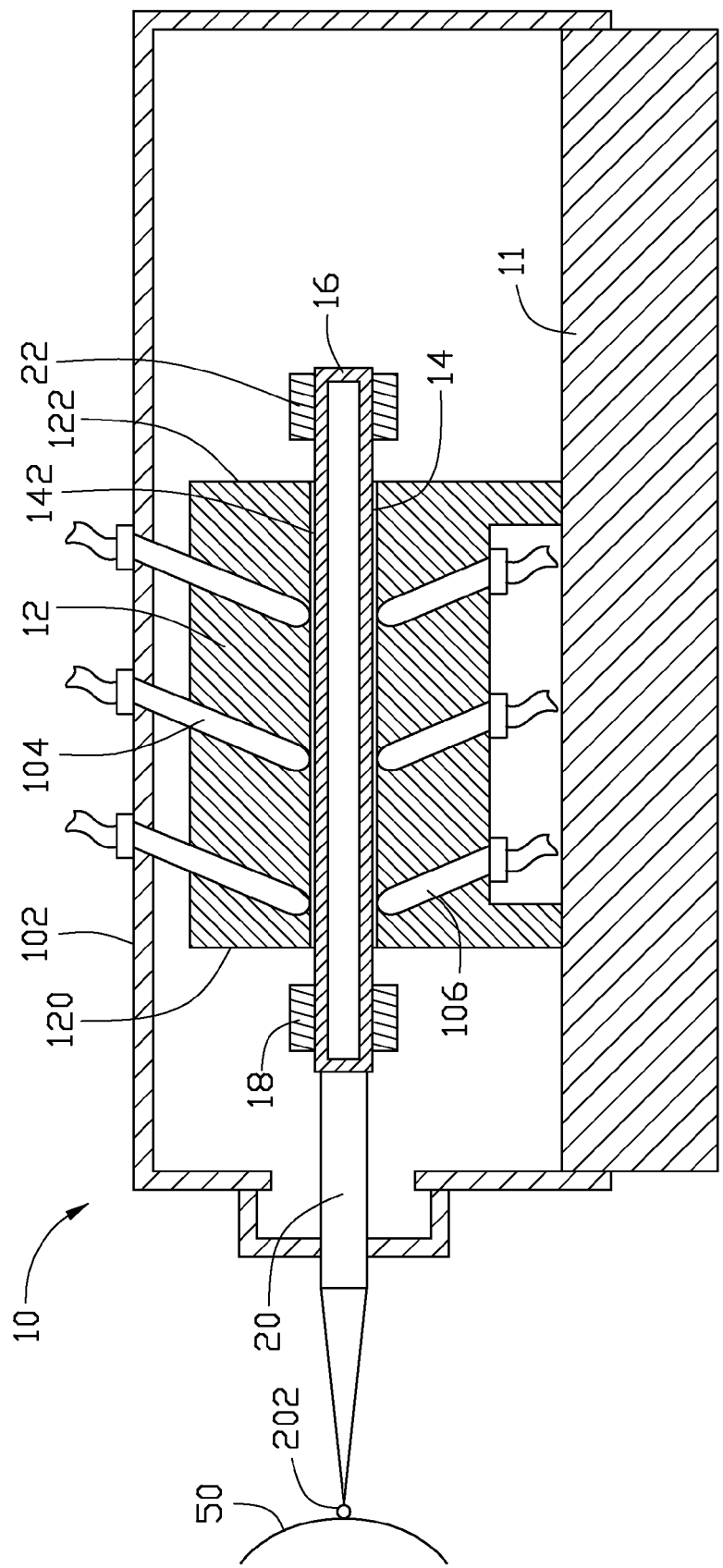
FIG. 2 is a cross-sectional view of the contour measuring probe of FIG. 1, corresponding to line II-II thereof.

Referring to FIG. 1 and FIG. 2, a contour measuring probe 10 of a first embodiment of the present invention includes a base 11, a tube guide 12, two hollow tubes 16, a first tube frame 18, a tip extension 20, a second tube frame 22, a linear measuring scale 24, a displacement sensor 26, a cover 102, and a plurality of pipes 104, 106. In alternative embodiments, the contour measuring probe 10 can include only one hollow tube 16 or more than two hollow tubes 16. The hollow tubes 16 and the first and second frames 18, 22 corporately form a movable rack (not labeled).

The base 11 is substantially a flat rectangular sheet. It should be understood that the base 11 may alternatively have other suitable shapes. The tube guide 12 is cuboid and mounted securely onto the base 11. The tube guide 12 has a front end 120 and a rear end 122. The tube guide 12 defines two tube chutes 14 each extending through from the front end 120 to the rear end 122. The tube chutes 14 are spaced apart and aligned parallel to each other. In alternative embodiments, the tube guide 12 may define only one tube chute 14 or more than two tube chutes 14, corresponding to the number of hollow tubes 16.

Each of the hollow tubes 16 is a hollow cylinder with two sealed ends. Each of the hollow tubes 16 runs through the corresponding tube chute 14 of the tube guide 12. One end of each hollow tube 16 protrudes out from the front end 120 and is fixed onto the second tube frame 18. The other end of each hollow tube 16 protrudes out from the rear end 122 and is fixed onto the first tube frame 22. An outer diameter of the hollow tubes 16 is configured to be smaller than a diameter of the tube chutes 14, so that a gap (not labeled) is defined between each hollow tube 16 and the tube guide 12. A flux of air is pumped into the gap between each hollow tube 16 and the tube guide 12. As a result, an air bearing 142 is formed between the tube guide 12 and the hollow tubes 16, thus friction forces between the tube guide 12 and the hollow tubes 16 is significantly small, thereby improving a precision of measurement. The air pumped into the gaps between the hollow tubes 16 and the tube guide 12 may be replaced by any other suitable kind of gas such as oxygen, nitrogen, etc. The hollow tubes 16 are made of one of stainless steel, aluminum (Al), titanium (Ti), and carbon steel.

The tip extension 20 is needle-shaped, and has a contact tip 202 that touches an object 50 when the contour measuring probe 10 is used for measuring the object 50. The tip extension 20 is fixed on the first tube frame 18 so that the tip extension 20 is linearly movable together with the movable rack. The linear measuring scale 24 is fixed on the second tube frame 22 such that it moves (displaces) linearly when the movable rack moves. The displacement sensor 26 is mounted on the base 11 corresponding to the linear measuring scale 24. The displacement sensor 26 is used for reading displacement values of the linear measuring scale 24. Alternatively, the positions of the linear measuring scale 24 and the displacement sensor 26 may be exchanged.

The cover 102 engages on the base 11 and completely seals the various other components of the contour measuring probe 10. The cover 102 defines an opening (not labeled) for allowing a part of the tip extension 20 to extend out therefrom.

The pipes 104, 106 are obliquely disposed in the tube guide 12 relative to an axis of the hollow tubes 16. Therefore, a flowing direction of the flux of air pumped in the gap between the hollow tube 16 and the tube guide 12 via the pipes 104, 106 is oblique to the moving direction of the tip extension 20. Further, an angle defined by extension directions of the pipes 104, 106 relative to the axis of the hollow tubes 16 is in a range from greater than 0 degrees to less than 90 degrees. The pipes 104 are mounted to the cover 102. The pipes 106 are disposed symmetrically to the pipes 104 relative to the axis of the hollow tubes 16, and the pipes 104, 106 are disposed in a same plane. In addition, the pipes 104, 106 are respectively parallel to and spaced from each other, and are communicated with the tube chutes 14 defined in the tube guide 12. Alternatively, the pipes 106 can be omitted. In such cases, the hollow tubes 16 may offset under a force applied thereon in a direction perpendicular to the axis of the hollow tubes 16. In alternative embodiments, the pipes 106 may not be symmetrical to the pipes 104, but stagger with the pipes 104 so long as a force applied on the hollow tubes 16 at all directions except a moving direction of the tip extension 20 is balance.

In use, the contour measuring probe 10 is placed near the object 50. The pipes 104, 106 respectively communicate with an air chamber (not shown). When a flux of air is pumped into the gap between the tube guide 12 and the hollow tubes 16, the hollow tubes 16 are pushed by a force applied on sidewalls of the hollow tubes 16 by the flux of air. Thus, the movable rack together with the tip extension 20 start to move. When the contact tip 202 of the tip extension 20 touches the object 50, the movable rack together with the tip extension 20 stops moving. When the tip extension 20 and correspondingly the linear measuring scale 24 move from one position to another position, the displacement sensor 26 detects and reads a displacement of the linear measuring scale 24. That is, a displacement of the tip extension 20 is measured.

When air is pumped into the gaps between the tube guide 12 and the hollow tubes 16, air pressure in the gaps pushes air out of the tube guide 12 via the tube chutes 14. That is, air is continuously pumped into the tube chutes 14 via the pipes 104, 106 and continuously ejected out of the tube guide 12 via the tube chutes 14. Thus, a pressure inside the cover 102 is kept higher than that of the environment outside the cover 102, because the cover 102 and the base 11 is filled with the air ejected out of the tube guide 12. Thereby, dust and other particles are prevented from entering a camber defined between the cover 102 and the base 11.

Figure 3:
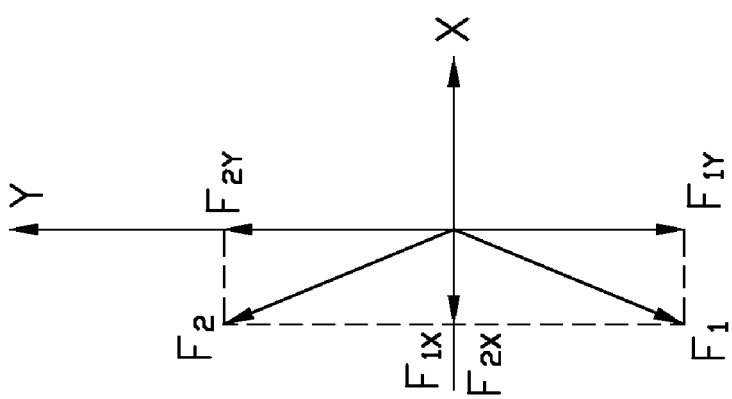
FIG. 3 is a force analysis view of tubes of the contour measuring probe of FIG. 2.

Referring to FIG. 3, when the flux of air is pumped into the tube chutes 14 and applies forces on a sidewall of the hollow tubes 16 via the pipes 104, 106, air from the pipes 104 applies a force $F_1$ and air from the pipes 106 applies a force $F_2$ on the hollow tubes 16. A value of the force $F_1$ is the same as that of the force $F_2$ because the number of the pipes 104 is the same as that of the pipes 106 and the pipes 106 and the pipes 104 are symmetrically disposed. Therefore, the resultant force applied on the hollow tubes 16 in an X-direction shown in FIG. 3 is $F_{1X}+F_{2X}$, and the resultant force applied on the hollow tubes 16 in a Y-direction is 0. The force $F_{1X}+F_{2X}$ pushes the hollow tubes 16 together with the tip extension 20 to move.

The force $F_{1X}+F_{2X}$ pushing the hollow tubes 16 to move is a part of the force $F_1+F_2$. Therefore, the force pushing the hollow tubes 16 is smaller than the force applying on the hollow tubes 16. If the flux of air is pumped into the pipes 104, 106 at a predetermined rate, the force applying on the hollow tubes 16 is determined by an angle defined between the direction of the pipes 104, 106 and the axis of the hollow tubes 16. That is, the greater the angle is, the smaller the force applies on the hollow tubes 16. Thereby, the force pushing the hollow tubes 16 can be adjusted to be relatively small and steady. The hollow tubes 16 together with the tip extension 20 are pushed by a small and steady force. As a result, the tip extension 20 gently touches the object 50. Thus, the contact tip 202 of the tip extension 20 and the object 50 cannot easily be deformed or damaged, and a measuring precision of the contour measuring probe 10 is very high.

Figure 4:
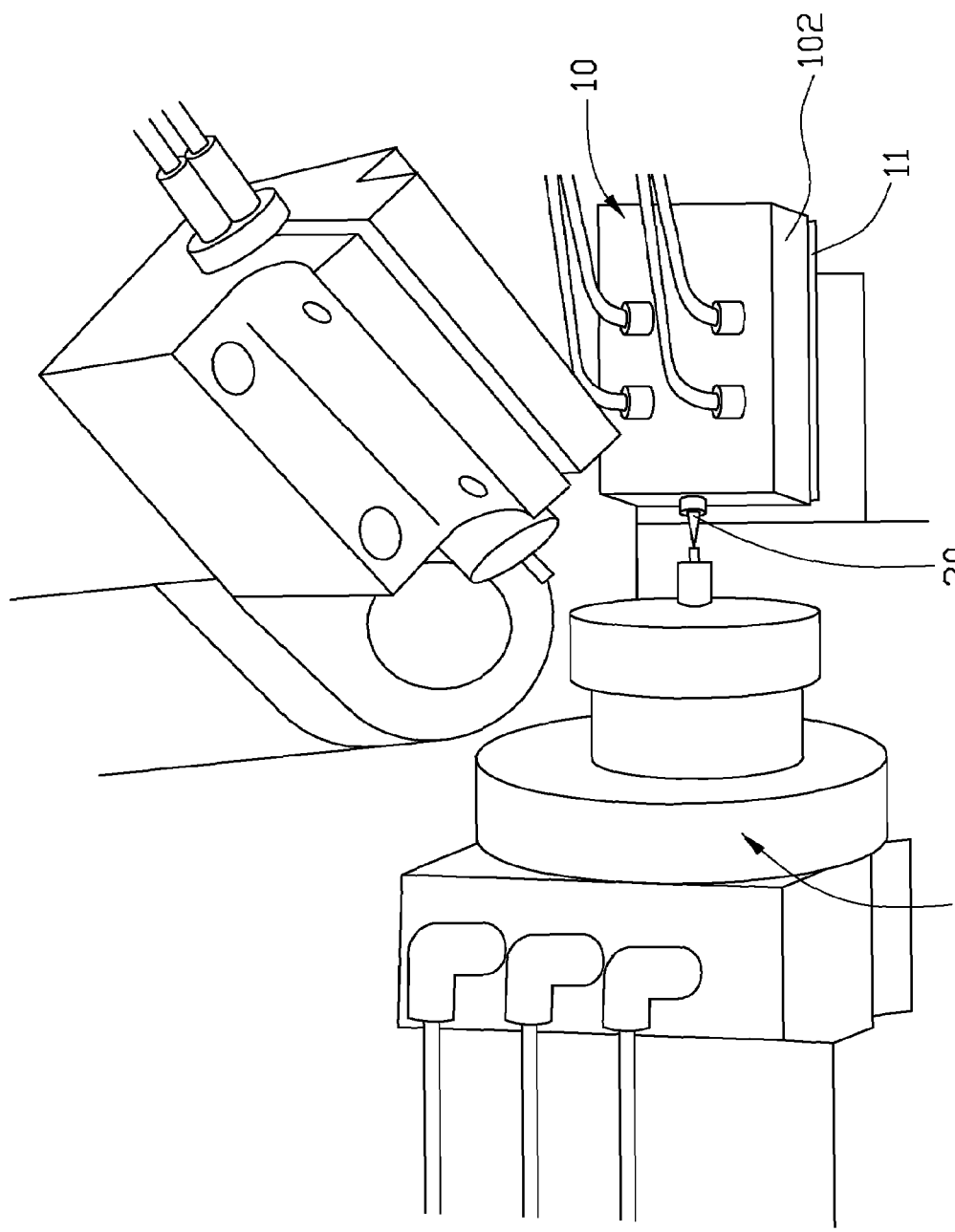
FIG. 4 is an isometric view of an exemplary application of the contour measuring probe of FIG. 1.

In manufacturing precision components such as optical lenses, the optical lenses generally need to be machined again if they do not fall within specified tolerances of shape and dimension. Referring to FIG. 4, the contour measuring probe 10 is applied in high precision equipment for manufacturing optical lenses. The optical lenses are measured on the one piece of equipment immediately after being machined. Therefore, there are no errors caused by releasing the optical lenses from machining equipment and reclamping the optical lenses on a measuring machine. Further, more time can be saved. Generally, the manufacturing time can be reduced by as much as 1/5 or even 1/3. The high precision equipment includes a master actuator that moves the contour measuring probe 10 in at least one direction. That is, the master actuator can be a single-axis actuator, a double-axis actuator, a triple-axis actuator, or can be another kind of driving master actuator.

The contour measuring probe 10 is connected to a processor (not shown). The master actuator of the high precision equipment, the contour measuring probe 10, and the processor cooperatively form a coordinate measuring machine. Supposing that a surface of the object 50 (e.g., an optical lens) is manufactured according to predetermined 3D (three-dimensional) coordinate surface values. When the tip extension 20 touches the object 50, the displacement sensor 26 sends values of the displacements of the tip extension 20 and the movable rack read from the linear measuring scale 24 to the processor. The processor records and manages the values.

Figure 5:
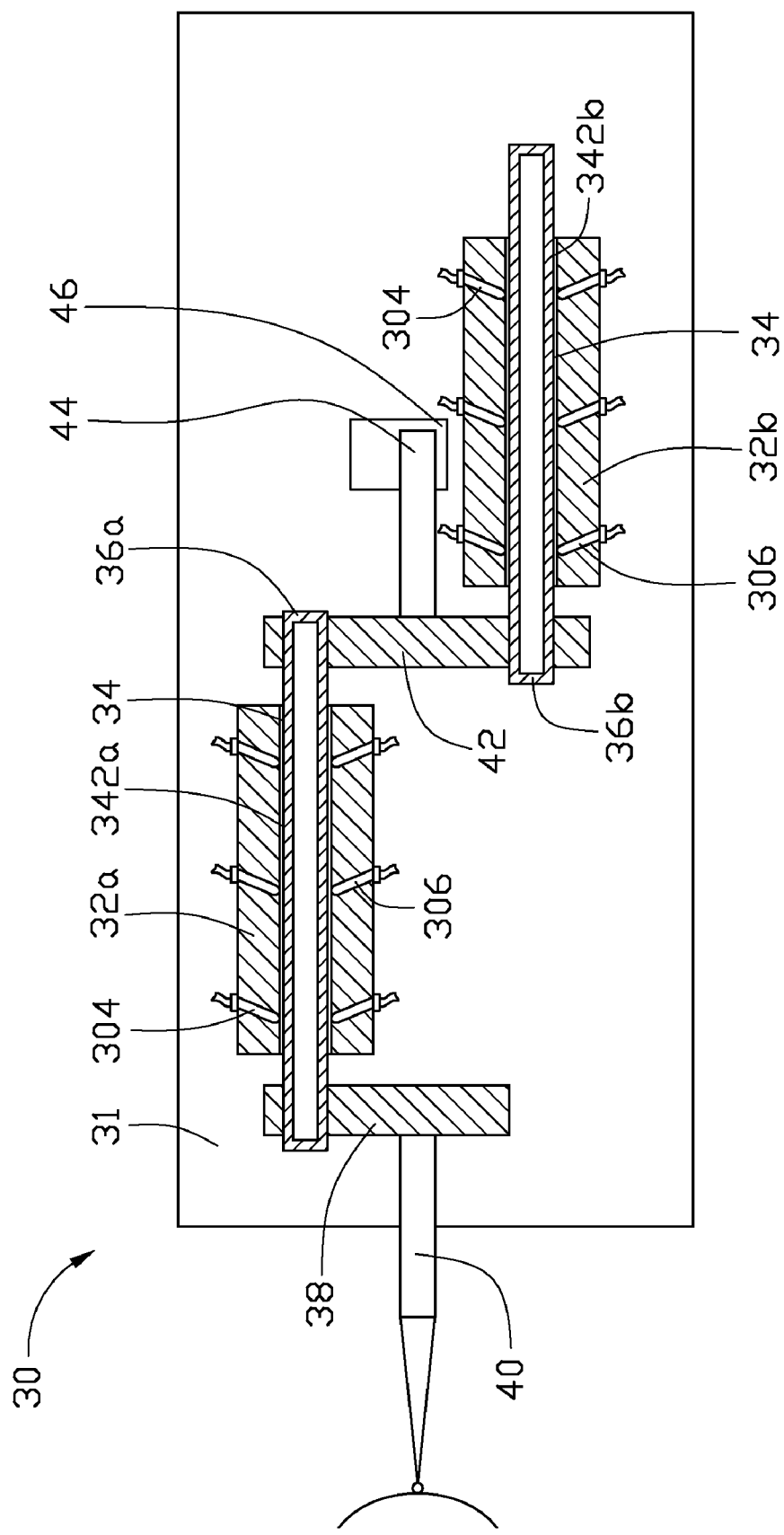
FIG. 5 is a top plan, cross-sectional view of a contour measuring probe in accordance with a second embodiment of the present invention.

Referring to FIG. 5, a contour measuring probe 30 of a second embodiment of the present invention includes a base 31, two tube guides 32a, 32b, two hollow tubes 36a, 36b, a first tube frame 38, a tip extension 40, a second tube frame 42, a linear measuring scale 44, a displacement sensor 46, and a plurality of pipes 304, 306. In alternative embodiments, the contour measuring probe 30 can include more than two hollow tubes 36a, 36b.

The tube guides 32a, 32b are mounted securely on the base 31. The tube guides 32a, 32b are spaced apart from and parallel to each other. Each tube guide 32a, 32b defines a tube chute 34 for receiving the corresponding hollow tube 36a, 36b. An air bearing 342a is formed between the hollow tube 36a and the tube guide 32a, and an air bearing 342b is formed between the hollow tube 36b and the tube guide 32b. The contour measuring probe 30 is similar in principle to the contour measuring probe 10 of the first embodiment, except that each of the tube guides 32a, 32b is cylinder defining only one tube chute 34 and the tube guides 32a, 32b offset each other. That is, the tube guide 32a is set at a front portion of the base 31, and the tube guide 32b is set at a back portion of the base 31. Because the tube guides 32a, 32b offset each other, the tube guides 32a, 32b in combination hold the hollow tubes 36a, 36b along a greater length as measured along a direction coinciding with an axis of movement of the tip extension 40, compared with a corresponding length along which the tube guide 12 holds the tip extension 20 in the contour measuring probe 10. Thus, the tip extension 40 can move steadily forward and backward with little or no lateral displacement.

Gaps (not labeled) between the hollow tubes 36a, 36b and the corresponding tube guides 32a, 32b are configured to form the air bearings 342a, 342b and eject air out of the tube guides 32a, 32b. In order to meet different discharges of the air pumped into the gaps, sizes of the gaps between the hollow tubes 36a, 36b and the corresponding tube guides 32a, 32b may be adjusted. Alternatively, an air discharge system (not shown) is defined in the tube guides 32a, 32b. The air discharge system communicate with the tube chutes 34 and eject air out of the tube guides 32a, 32b. Gaps (not shown) between the pipes 304, 306 and the tube guides 32a, 32b may also be configured to eject air out of the tube guides 32a, 32b.

Figure 6:
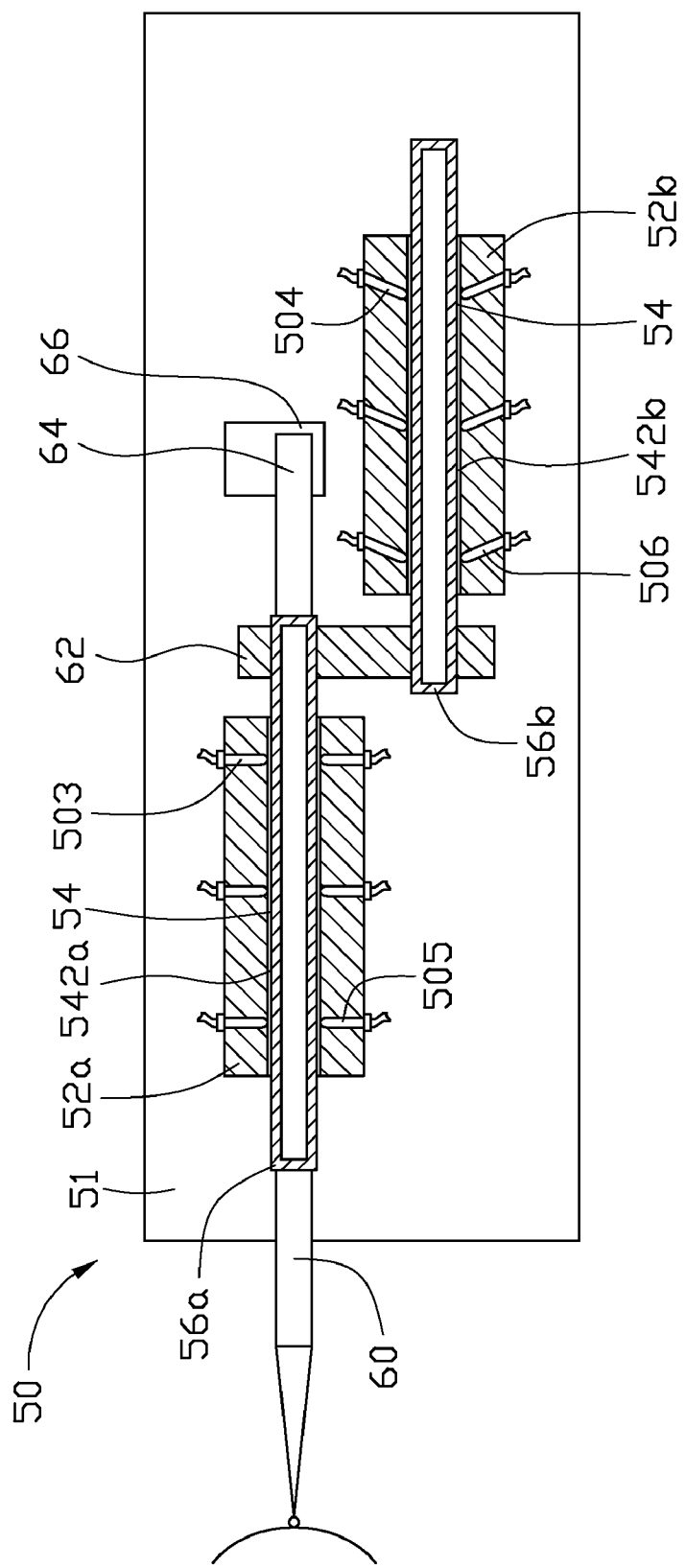
FIG. 6 is a top plan, cross-sectional view of a contour measuring probe in accordance with a third embodiment of the present invention.

Referring to FIG. 6, a contour measuring probe 50 of a third embodiment of the present invention includes a base 51, two tube guides 52a, 52b, two hollow tubes 56a, 56b, a tip extension 60, a tube frame 62, a linear measuring scale 64, a displacement sensor 66, and a plurality of pipes 503, 504, 505, 506.

The tube guides 52a, 52b are mounted securely on the base 51. The tube guides 52a, 52b are spaced apart from and parallel to each other. Each tube guides 52a, 52b defines a tube chute 54 for receiving the corresponding hollow tube 56a, 56b. A plurality of pipes 504, 506 are obliquely disposed in a tube guide 52b relative to the hollow tube 56b. The pipes 504, 506 are oblique relative to an axis of the hollow tube 56b. That is, an angle defined by extending the directions of the pipes 504 relative to the axis of the hollow tube 56b is in a range from greater than 0 degree to less than 90 degrees. The pipes 506 are disposed symmetrically to the pipes 504 relative to the axis of the hollow tube 56b, and the pipes 504, 506 are disposed in a same plane.

The contour measuring probe 50 is similar in principle to the contour measuring probe 30, except that a plurality of pipes 503, 505 are perpendicularly disposed in the tube guide 52a relative to the hollow tube 56a, and the tip extension 60 is directly fixed to the hollow tube 56a. When a flux of air is pumped into the tube chute 54 via the pipes 503, 504, 505, 506, an air bearing 542a is formed between the hollow tube 56a and the tube guide 52a, and an air bearing 542b is formed between the hollow tube 56b and the tube guide 52b. Therefore, friction forces between the hollow tubes 56a and the tube guide 52a, and between the hollow tube 56b and the tube guide 52b, are significantly small. In addition, because the pipes 504, 506 are obliquely disposed in the tube guide 52b relative to the hollow tube 56b, air pumped into the pipes 504, 506 applies an oblique force relative to the hollow tube 56b on a sidewall of the hollow tube 56b. The oblique force applied on the hollow tube 56b partially pushes the hollow tubes 56a, 56b together with the tip extension 60 to move. Further, because the tube guides 52a, 52b offset each other, for reasons similar to those described above in relation to the contour measuring probe 30, the tip extension 60 of the contour measuring probe 50 can move very steadily forward and backward with little or no lateral displacement. Alternatively, the positions of the pipes 503, 505 and the pipes 504, 506 may be exchanged. In alternative embodiments, the contour measuring probe 50 can includes more than two hollow tubes 56a, 56b. Adjacent hollow tubes 56a, 56b offset each other. In such cases, there can be more than two tube guides 52a, 52b.

Because the contour measuring probes 10, 30, 50 each has the hollow tubes 16, 36a, 36b, 56a, 56b, the tip extensions 20, 40, 60 effectively cannot move in directions other than a direction parallel to axes of the hollow tubes 16, 36a, 36b, 56a, 56b. The hollow tubes 16, 36a, 36b, 56a, 56b may be replaced by any other kind of driving members such as hollow cylinders with two open ends, solid cylinders, etc. The driving members are configured to be driven by a flux of air pumped on a sidewall of the driving member to push the tip extensions 20, 40, 60 to move. In typical use of the contour measuring probes 10, 30, 50, the hollow tubes 16, 36a, 36b, 56a, 56b are oriented horizontally. However, the measuring forces of the contour measuring probes 10, 30, 50 are minimally or not influenced by gravity.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A contour measuring probe, comprising:
   at least one tube guide;
   a tip extension for touching a surface of an object, the tip extension being linearly movable relative to the at least one tube guide;
   at least one hollow tube partly running through the at least one tube guide and linearly slidable in the at least one tube guide, the at least one hollow tube to be driven by a flux of air pumped on a sidewall of the at least one hollow tube to push the tip extension to move, a flowing direction of the flux of air being obique to the moving direction of the tip extension, at least part of the flux of air pumped on the sidewall of the at least one hollow tube being ejected out of the at least one tube guide;
   a linear measuring scale configured to display values of displacements of the tip extension, the linear measuring scale being fixed relative to one of the at least one tube guide and the tip extension; and
   a displacement sensor configured to detect and read the displacement values of the tip extension displayed by the linear measuring scale, the displacement sensor being fixed relative to the other one of the at least one tube guide and the tip extension.

2. The contour measuring probe as claimed in claim 1, further comprising at least one pipe, the at least one pipe is obliquely disposed in the at least one tube guide relative to an axis of the at least one hollow tube, an angle defined by an extension direction of the at least one pipe relative to the axis of the hollow tube is in a range from greater than 0 degrees to less than 90 degrees.

3. The contour measuring probe as claimed in claim 2, wherein the at least one tube guide defines at least one tube chute, the at least one hollow tube is received in the corresponding tube chute, each end of the at least one hollow tube protrudes out of the corresponding tube chute, and a gap is defined between the at least one hollow tube and the at least one tube guide so that an air bearing is formed between the at least one hollow tube and the at least one tube guide when air is pumped into the gap via the at least one pipe.

4. The contour measuring probe as claimed in claim 3, wherein at least part of air pumped into the gap is ejected out of the at least one tube guide by the at least one tube chute.

5. The contour measuring probe as claimed in claim 4, further comprising a base, the at least one tube guide is mounted securely on the base.

6. The contour measuring probe as claimed in claim 5, further comprising a cover engaging on the at least one tube guide, the at least one hollow tube, the linear measuring scale, and the displacement sensor so as to prevent dust from entering a chamber defined between the cover and the base, the cover defines an opening for allowing a part of the tip extension to extend out therefrom.

7. The contour measuring probe as claimed in claim 5, wherein the at least one tube guide is one tube guide, the at least one hollow tube is two hollow tubes, and the tube guide defines two or more tube chutes therein, the tube chutes are spaced apart from and aligned parallel to one another.

8. The contour measuring probe as claimed in claim 7, further comprising a first tube frame and a second tube frame; one end of each of the hollow tubes and the tip extension is fixed to the first tube frame, the other end of each of the hollow tubes and one of the linear measuring scale and the displacement sensor is fixed to the second tube frame.

9. The contour measuring probe as claimed in claim 5, wherein the at least one tube guide comprises a first tube guide and a second tube guide, the at least one hollow tube is two hollow tubes including a first hollow tube, each tube guide defines a tube chute for receiving one of the hollow tubes, the first and second tube guides offset each other.

10. The contour measuring probe as claimed in claim 9, further comprising a first tube frame, a second tube frame, one of the linear measuring scale and the displacement sensor are fixed to the second tube frame, one end of the first hollow tube and the tip extension are fixed to the first tube frame.

11. The contour measuring probe as claimed in claim 9, further comprising a tube frame, the tube frame and the linear measuring scale are fixed to one end of the first hollow tube, the tip extension is fixed to the other end of the first hollow tube.

12. The contour measuring probe as claimed in claim 1, wherein the sidewall extends parallel to the moving direction of the tip extension.

13. A contour measuring probe, comprising:
    a tip extension for touching a surface of an object;
    at least one driving member being configured to be driven by a flux of air pumped on a sidewall of the at least one driving member to push the tip extension to move, a flowing direction of the flux of air being oblique to the moving direction of the tip extension; and
    at least one pipe for allowing the flux of air to be pumped on the sidewall of the at least one driving member, an angle defined by an extension direction of the at least one pipe relative to the axis of the driving member being in a range from greater than 0 degrees to less than 90 degrees.

14. The contour measuring probe as claimed in claim 13, further comprising a linear measuring scale configured to display values of displacements of the tip extension, and a displacement sensor configured to detect and read the displacement values of the tip extension displayed by the linear measuring scale.

15. The contour measuring probe as claimed in claim 13, further comprising at least one tube guide, the at least one driving member partly runs through the at least one tube guide and linearly slidable in the at least one tube guide, the at least one pipe is obliquely disposed in the at least one tube guide relative to an axis of the at least one driving member.

16. The contour measuring probe as claimed in claim 15, wherein the at least one tube guide defines at least one tube chute, the at least one driving member is received in the corresponding tube chute, and a gap is defined between the at least one tube guide and the at least one driving member so that an air bearing is formed between the at least one tube guide and the at least one driving member when air is pumped into the gap via the at least one pipe.

17. The contour measuring probe as claimed in claim 16, wherein at least part of the air pumped into the gap is ejected out of the at least one tube guide via the at least one tube chute.

18. The contour measuring probe as claimed in claim 13, wherein the sidewall extends parallel to the moving direction of the tip extension.

* * * * *